US011101733B2

(12) United States Patent
Nagahama et al.

(10) Patent No.: US 11,101,733 B2
(45) Date of Patent: Aug. 24, 2021

(54) POWER SUPPLY CONTROL DEVICE

(71) Applicant: Sumitomo Wiring Systems, Ltd., Mie (JP)

(72) Inventors: Takahiro Nagahama, Mie (JP); Hiroshi Kimoto, Mie (JP); Hiroki Onoyama, Nishio (JP); Nobutoshi Hagiwara, Miyoshi (JP); Shinji Oshita, Toyota (JP); Kenichi Takayoshi, Nisshin (JP); Takumi Matsumoto, Nagakute (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 17/040,165

(22) PCT Filed: Mar. 12, 2019

(86) PCT No.: PCT/JP2019/009871
§ 371 (c)(1),
(2) Date: Sep. 22, 2020

(87) PCT Pub. No.: WO2019/181635
PCT Pub. Date: Sep. 26, 2019

(65) Prior Publication Data
US 2021/0119535 A1   Apr. 22, 2021

(30) Foreign Application Priority Data

Mar. 22, 2018   (JP) .............................. JP2018-054223

(51) Int. Cl.
*H02M 3/156*   (2006.01)
*H02M 1/08*   (2006.01)

(52) U.S. Cl.
CPC ............. *H02M 3/156* (2013.01); *H02M 1/08* (2013.01)

(58) Field of Classification Search
CPC ................................ H02M 1/08; H02M 3/156
(Continued)

(56) References Cited

U.S. PATENT DOCUMENTS 10,972,088 B1 *   4/2021   Barrenscheen ........ G01R 27/16
2005/0248317 A1   11/2005   Yang
(Continued)

FOREIGN PATENT DOCUMENTS

JP    H11-334497 A    12/1999
WO   2013-115035 A1   8/2013

OTHER PUBLICATIONS

International Search Report, Application No. PCT/JP2019/09871, dated May 21, 2019. ISA/Japan Patent Office.

*Primary Examiner* — William Hernandez
(74) *Attorney, Agent, or Firm* — Honigman LLP

(57) ABSTRACT

A power supply control device includes a control unit that executes determination processing that, when an operation instruction is received from a switch input detection unit, determines, in a case in which the switch circuit is turned on, whether or not a power source voltage value will decrease to or below an acceptable voltage value on the basis of a power source voltage value obtained from a voltage detection unit and a load current value stored in a storage unit in advance; and in the determination processing, executes switch control processing which allows the switch circuit to be turned on if the power source voltage value is determined to not decrease to or below the acceptable voltage value and does not allow the switch circuit to be turned on if the power source voltage value is determined to decrease to or below the acceptable voltage value.

19 Claims, 4 Drawing Sheets

(58) Field of Classification Search
USPC .................................. 307/31; 327/108, 109
See application file for complete search history.

(56) References Cited

U.S. PATENT DOCUMENTS

| | | | |
|---|---|---|---|
| 2008/0024074 A1* | 1/2008 | Mosebrook | H05B 39/08 |
| | | | 315/291 |
| 2012/0245794 A1 | 9/2012 | Aragai et al. | |
| 2012/0286591 A1 | 11/2012 | Schiemann et al. | |
| 2018/0175855 A1* | 6/2018 | Romano | H03K 17/166 |
| 2018/0304827 A1* | 10/2018 | Ikuta | H02J 1/06 |

\* cited by examiner

POWER SUPPLY CONTROL DEVICE

CROSS-REFERENCE TO RELATED APPLICATIONS

This application is the U.S. national stage of PCT/JP2019/009871 filed on Mar. 12, 2019, which claims priority of Japanese Patent Application No. JP 2018-054223 filed on Mar. 22, 2018, the contents of which are incorporated herein.

TECHNICAL FIELD

The technology disclosed in the present specification relates to a power supply control device and specifically relates to a technology for controlling the power supply from a power source to a load with the power source for supplying power to the load being used within an acceptable range.

BACKGROUND

For example, the known technology described in JP 2012-200100A controls power supply from a power source to a load with the power source for supplying power to the load being used within an acceptable range. The technology described in JP 2012-200100A includes a power source management unit that detects a total current value based on load current values. In the case of the total current value exceeding a threshold, the power source management unit sequentially stops power supply to the loads with lower operation priorities on the basis of set priorities. Thus, when an abnormality occurs in the total current value, operation of all of the loads is prevented from stopping and the total current value is returned to an acceptable value.

However, with the technology described in JP 2012-200100A, in the case of an error occurring in the power source management unit, control of the load current may be lost. When control of the load current is lost, particularly in a case in which the power source is a battery, there is a possibility that the battery will run out of power or that the battery voltage will decrease until the load is turned off. Thus, there is a demand for a technology with a simple configuration without a power source management unit that is capable of controlling power supply to a load with the power source for supplying power to the load being used within an acceptable range.

The technology disclosed in the present specification provides a power supply control device with a simple configuration that is capable of supplying power from a power source to a load within an acceptable range of the power source.

SUMMARY

A power supply control device disclosed in the present specification is a power supply control device for controlling power supply from a power source to a load while connected to a power supply path that supplies power from the power source to the load, the power supply control device including: a switch circuit configured to be connected to the power supply path, and to switch supply of a load current from the power source to the load on and off a voltage detection unit configured to detect a power source voltage value of the power source; a current detection unit configured to detect the load current; a storage unit configured to store a load current value, which is a value of the load current; a switch input detection unit configured to be connected to a user switch for a user to perform an operation instruction of the load, and to detect an input of a switch signal from the user switch; and a control unit configured to control the switch circuit on and off, wherein the control unit executes determination processing that, when the operation instruction is received from the switch input detection unit, determines, whether or not the power source voltage value will decrease to or below an acceptable voltage value if the switch circuit is turned on, on the basis of the power source voltage value obtained from the voltage detection unit and the load current value stored in the storage unit in advance, and cutes switch control processing which allows the switch circuit to be turned on if the power source voltage value is determined to not decrease to or below the acceptable voltage value in the determination processing, and does not allow the switch circuit to be turned on if the power source voltage value is determined to decrease to or below the acceptable voltage value in the determination processing.

According to this configuration, the control unit determines, in the case in which the switch circuit is turned on to supply power to the load, whether or not the power source voltage value will decrease to or below an acceptable voltage value on the basis of the detected power source voltage value and the load current value stored in the storage unit in advance. In the case in which the power source voltage value is determined to decrease to or below an acceptable voltage value, the switch circuit is not turned on. Thus, power can be supplied within the acceptable voltage range of the power source without a power source management unit being employed. In other words, with the power supply control device of this configuration, power can be supplied from the power source to the load within an acceptable range of the power source using a simple configuration.

The power supply control device described above may have a configuration in which the control unit further executes voltage decrease determination processing which determines whether or not the power source voltage value has decreased to or below the acceptable voltage value after the switch circuit is turned on in the switch control processing.

According to this configuration, in the case in which, after the switch control processing, fluctuations in the load, a change in the installation environment, or the like cause the power source voltage to decrease to or below an acceptable voltage value, the load can be turned off in response to this change. In other words, in the switch control processing, after the load is turned on by control being performed to turn on the switch circuit, in the case in which the power source voltage decreases to or below an acceptable voltage value, the load can be turned off.

The power supply control device described above may have a configuration in which the control unit further executes voltage increase determination processing which determines whether or not the power source voltage value has increased above the acceptable voltage value after the switch circuit is not allowed to be turned on in the switch control processing.

According to this configuration, in the case in which, after the switch control processing, fluctuations in the load, a change in the installation environment, or the like cause the power source voltage to increase above an acceptable voltage value, the load can be turned on in response to this change. In other words, in the switch control processing, after the load is turned off by control being performed to not allow the switch circuit to be turned on, in the case in which the power source voltage increases above an acceptable voltage value, the load can be turned on.

Also, the power supply control device described above may have a configuration in which the storage unit stores a maximum load current value, which is one of a plurality of the detected load current values, and the control unit executes the determination processing on the basis of the power source voltage value and the maximum load current value that is stored in the storage unit.

According to this configuration, determination processing can be performed in the most extreme conditions of the load current value. In this way, an error caused by a decrease in the power source voltage can be reliably prevented. For example, in the case of the power source being a vehicle battery, engine shutdown can be reliably prevented.

Also, the power supply control device described above may have a configuration in which the storage unit stores a map indicating a relationship between a power source voltage and the load current, the map including an on region where the switch circuit is allowed to be turned on and an on inhibited region where the switch circuit is not allowed to be turned on, and the control unit references the map in performing the determination processing.

According to this configuration, determination processing can be easily performed referencing a map.

Also, the power supply control device described above may have a configuration in which the storage unit stores a plurality of maps in which the on region and the on inhibited region are different, and the control unit references one of the plurality of maps in performing the determination processing.

According to this configuration, by having the plurality of maps corresponding to, for example, change over time of the power source or the environment temperature, a more correct determination processing can be performed.

Also, the power supply control device described above may have a configuration in which the plurality of maps are maps corresponding to change over time of the power source, and the control unit references a map of the plurality of maps corresponding to change over time of the power source in performing the determination processing.

According to this configuration, control of power supply to a load in accordance with change over time of the power source, for example, a decrease in power source voltage due to an increase in the internal resistance of the power source over time, can be performed.

Also, the power supply control device described above may have a configuration in which the load is constituted by a plurality of loads, the switch circuit is provided for each one of the plurality of loads, the switch input detection unit detects an input of a switch signal from a user switch corresponding to each one of the plurality of loads, the storage unit stores, as the load current value, a load current value corresponding to each one of the plurality of loads and a total load current value, which is a sum of the load current values of the plurality of loads, the control unit, in determination processing, determines whether or not the power source voltage value will decrease to or below the acceptable voltage value if a switch circuit corresponding a load for which an operation instruction has been performed is turned on, on the basis of the power source voltage value obtained from the voltage detection unit and each load current value and the total load current value stored in the storage unit in advance.

According to this configuration, even in the case in which the control unit controls the power supply to the plurality of loads, power can be supplied to the plurality of loads from the power source within an acceptable range of the power source using a simple configuration.

Advantageous Effects of Disclosure

According to a power supply control device disclosed in the present specification, power can be supplied from a power source to a load within an acceptable range of the power source using a simple configuration.

DETAILED DESCRIPTION OF PREFERRED EMBODIMENTS

Figure 1:
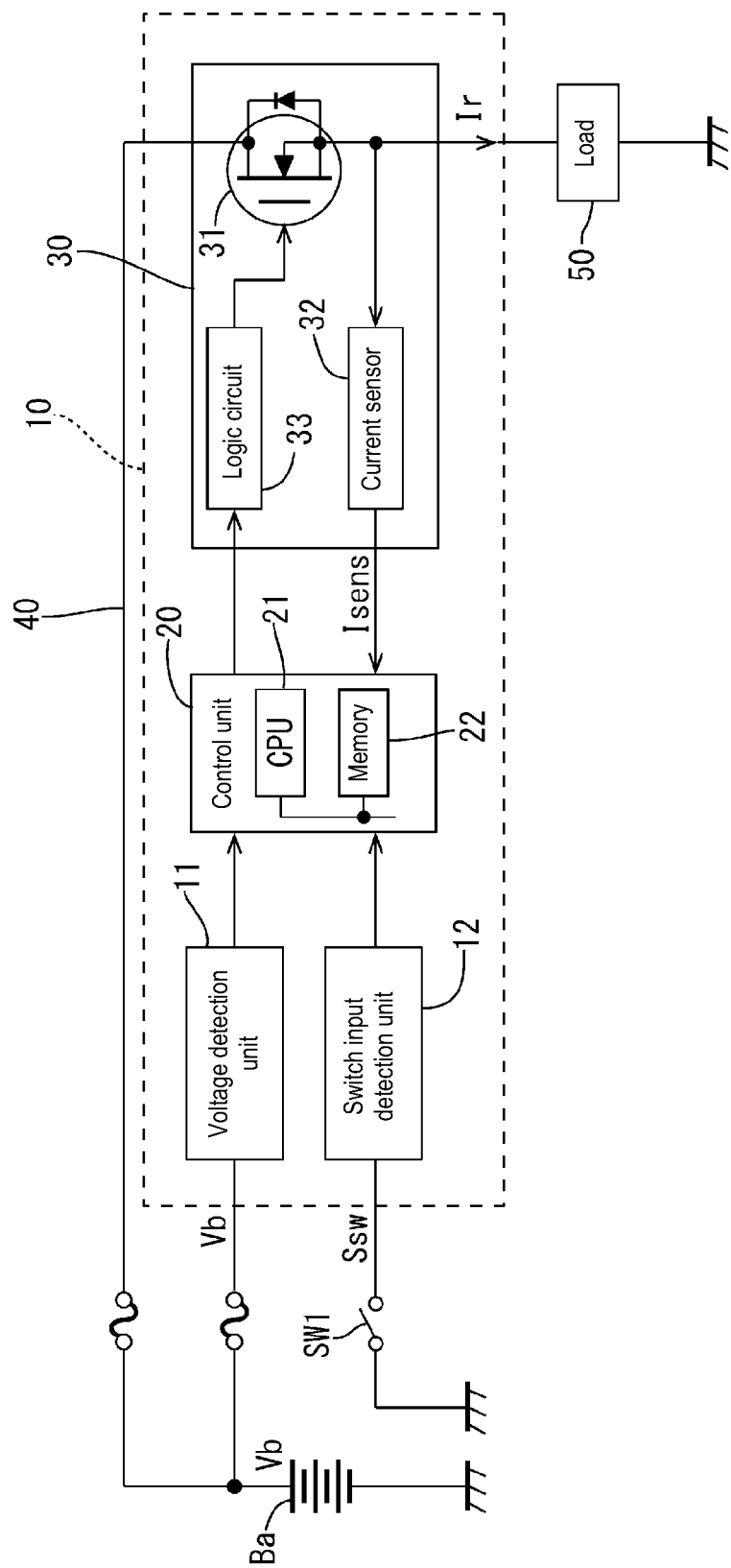
FIG. 1 is a block diagram schematically showing a power supply control device of an embodiment according to the present disclosure.

An embodiment according to the present disclosure will be described with reference to FIGS. 1 to 3.
Circuit Configuration As shown in FIG. 1, a power supply control device 10 is located between a battery (an example of a power source) Ba and a load 50 and connected to a power supply path 40 for supplying power from the battery Ba to the load 50. The power supply control device 10 controls the power supply from the battery Ba to the load 50. In the present embodiment, the power supply control device 10 is an electronic control unit (ECU) installable in a vehicle. The battery Ba is a vehicle battery installable in a vehicle. Note that the power supply control device is not limited to being an ECU and the power source is not limited to being a vehicle battery.

The power supply control device 10 includes a voltage detection unit 11, a switch input detection unit 12, a control unit 20, and an intelligent power switch (IPS) 30.

The IPS 30 includes a semiconductor switch element (an example of a switch circuit) 31, a current sensor (an example of a current detection unit) 32, and a logic circuit 33. In the present embodiment, the semiconductor switch element 31 is constituted by an n-channel MOSFET and turns on or off a current Ir flowing from the battery Ba to the load 50. Also, the current sensor 32 is constituted by a sense MOSFET. Note that the switch circuit is not limited to being a semiconductor switch element. Also, the current sensor is not limited to being a sense MOSFET.

The current sensor 32 generates a sense current Isens that has a predetermined ratio relationship with the load current Ir. The sense current Isens, for example, is converted, by a current voltage converter circuit (not illustrated), to a sense voltage signal that has a proportional relationship with the sense current Isens, and the sense voltage signal is supplied to the control unit 20.

The voltage detection unit 11 detects a power source voltage Vb of the battery Ba. The switch input detection unit 12 is connected to a user switch SW1 for receiving an operation instruction for the load 50 from a user and detects an input to the power supply control device 10 of a switch signal Ssw from the user switch SW1.

The control unit 20, for example, includes a CPU 21 and a memory (an example of a storage unit) 22 and controls turning on or off the semiconductor switch element 31. The memory 22 stores various programs executed by the CPU 21; detection values associated with the programs, for example, a load current value; and the like.

Control of Power Supply to the Load

Next, the control of power supply to the load 50 will be described with reference to FIGS. 2 and 3. The power supply control is performed in accordance with a predetermined program executed by the control unit 20, specifically by the CPU 21.

In the power supply control, the CPU 21 first obtains information of the user switch SW1 (switch signal Ssw information) from the switch input detection unit 12 together with the power source voltage (battery voltage) Vb from the voltage detection unit 11 (step S10). Note that though not shown in FIG. 2, the CPU 21 obtains the battery voltage Vb from the voltage detection unit 11 regularly after a predetermined amount of time.

Next, whether or not the user switch SW1 is on is determined on the basis of the information of the switch signal Ssw (step S20). If the user switch SW1 is determined to not be on (NO in step S20), the process returns to the processing of step S10. If the user switch SW1 is determined to be on (YES in step S20), the process moves to the processing of step S30.

Figure 3:
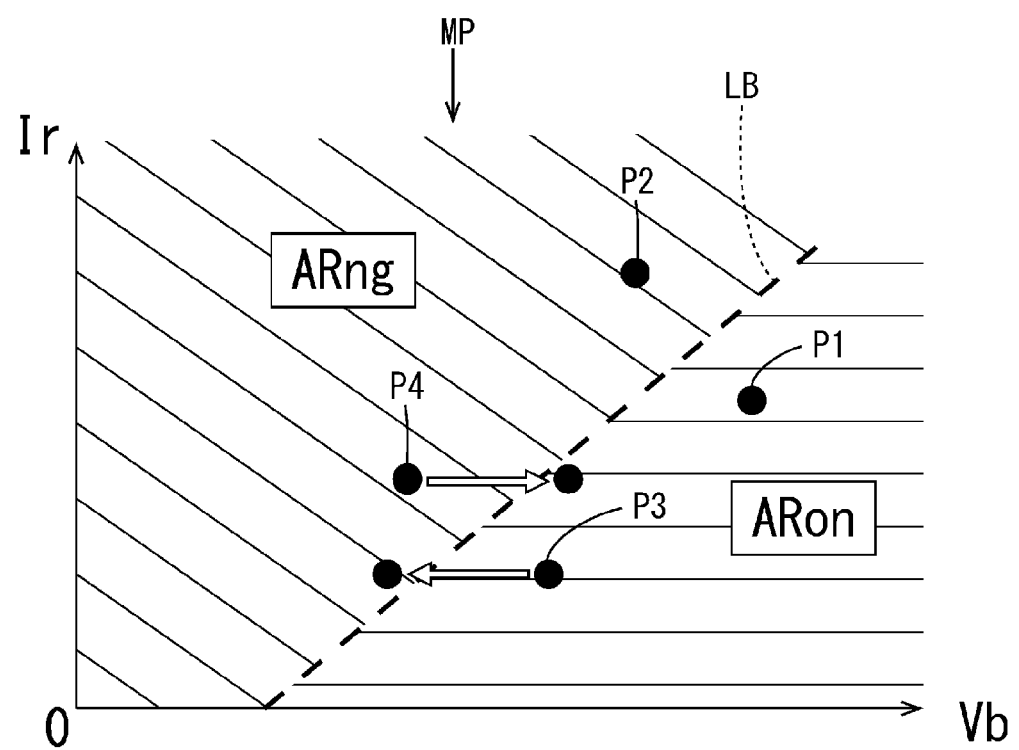
FIG. 3 is a map schematically showing an on region and an on inhibited region associated with a power source voltage and a load current.

In step S30, the CPU 21 references a load current/power source voltage map (simply referred to as "map" below) MP, as shown in FIG. 3, stored in the memory 22 which indicates the relationship between the load current and the power source voltage (specifically, references map data) and determines whether or not to turn on the load 50 in accordance with the user instruction. In other words, the CPU 21 references the map MP and determines, in the case in which the semiconductor switch element 31 is turned on, whether or not the battery voltage value Vb will decrease to or below an acceptable voltage value on the basis of the battery voltage value Vb obtained from the voltage detection unit 11 and the load current value Ir stored in the memory 22 in advance. In this way, determination processing can be easily performed by referencing the map MP.

The map MP is formed from data (coordinate data) of points P determined by the load current and the power source voltage and includes an on region ARon where the semiconductor switch element 31 is allowed to be turned on and an on inhibited region (NG region) ARng where the semiconductor switch element 31 is not allowed to be turned on. In other words, the on region ARon is a region where, when the semiconductor switch element 31 is turned on and the load current value Ir flows, the battery voltage value Vb does not decrease to or below the acceptable voltage value. The on inhibited region (NG region) ARng is a region where, when the semiconductor switch element 31 is turned on and the load current value Ir flows, the battery voltage value Vb decreases to or below the acceptable voltage value.

In the map MP, a division line LB that divides the on region ARon and the on inhibited region ARng is shown as a dashed line. The on region ARon and the on inhibited region ARng, for example, are determined for the load 50 in advance via testing or the like using the load 50. In this case, in determining the on region ARon, the voltage drop amount of the battery voltage value Vb due to the load current value Ir is considered. Note that the division between the on region ARon and the on inhibited region ARng may be formed by a division region with a predetermined voltage width instead of the division line LB.

Note that in the processing of step S30, a current value of the previous time the load was turned on or an initial value corresponding to the load 50 is used for the load current Ir. This current value or initial value is stored in the memory 22. The processing of step S30 is an example of determination processing.

In the determination processing of step S30, when the relationship (position on the map MP) between the load current Ir and the power source voltage Vb is determined to be in the on region ARon as shown by point P1 in FIG. 3 (YES in step S40), the CPU 21 turns on the semiconductor switch element 31, turning on the load 50 (step S50). Specifically, an on signal for turning on the semiconductor switch element 31 is supplied to the IPS 30, the semiconductor switch element 31 is turned on, and power is supplied to the load 50. The processing of step S50 corresponds to switch control processing.

Here, the CPU 21 obtains the load current value Ir (both the load current and the load current value are denoted by the same reference sign "Ir") on the basis of the sense current Isens detected by the current sensor 32 and stores the load current value Ir as load current information in the memory 22 (step S60). Here, in the present embodiment, only when the load current value Ir of the present time the load is turned on is a maximum current value Imax up until now, the maximum current value Imax is updated and stored. In other words, the maximum value Imax of the load current value Ir is stored in the memory 22 as load current information and used in the determination in step S30 when the load is turned on next time.

Next, the CPU 21 determines whether or not the battery voltage Vb obtained from the voltage detection unit 11 has decreased to a value within the on inhibited region (NG region) ARng of the map MP when the load 50 is on (step S70). The processing of step S70 corresponds to voltage decrease determination processing.

If the battery voltage Vb is determined to have decreased to a value within the NG region ARng (YES in step S70), the process moves to step S80, the semiconductor switch element 31 is turned off, and power supply to the load 50 is stopped, turning off the load 50. This shift is shown on the map MP by an arrow from a point P3 in FIG. 3. If the battery voltage Vb is determined to not have decreased to a value within the NG region ARng (NO in step S70), power supply to the load 50 is continued.

In this way, in the case in which, after the switch control processing of step S50, fluctuations in the load 50, a change in the installation environment, or the like cause the battery voltage Vb to decrease to or below an acceptable voltage value, the load 50 can be turned off via the processing of step S70 in response to this change. In other words, in the switch control processing, after the load 50 is turned on by control being performed to turn on the semiconductor switch element 31, in the case in which the battery voltage Vb decreases to or below an acceptable voltage value, the load 50 can be turned off.

Also, in the determination processing of step S30, when the relationship (position on the map MP) between the load current Ir and the power source voltage Vb is determined to be in the on inhibited (NG region) ARng as shown by point P2 in FIG. 3 (NO in step S40), the CPU 21 does not turn on the semiconductor switch element 31 and maintains the off state of the load 50 regardless of an on instruction from a user (step S80). Specifically, an on signal for turning on the semiconductor switch element 31 is not supplied to the IPS 30. In this way, power is not supplied to the load 50. The processing of step S80 corresponds to switch control processing.

Next, the CPU 21 determines whether or not the battery voltage Vb obtained from the voltage detection unit 11 has increased to a value within the on region ARon from the NG region ARng of the map MP when the load 50 is on (step S90). The processing of step S70 corresponds to voltage increase determination processing.

If the battery voltage Vb is determined to have increased to a value within the on region ARon (YES in step S90), the process moves to step S50, the semiconductor switch element 31 is turned on, and power supply to the load 50 is started, turning on the load 50. This shift is shown on the map MP by an arrow from a point P4 in FIG. 3.

If the battery voltage Vb is determined to not have increased to a value within the on region ARon (NO in step S90), power is not supplied to the load 50 and the load 50 is maintained in an off state.

In this way, in the case in which, after the switch control processing of step S80, fluctuations in the load 50, a change in the installation environment, or the like cause the battery voltage Vb to increase above an acceptable voltage value, the load 50 can be turned on via the processing of step S90 in response to this change. In other words, in the switch control processing, after the load 50 is turned off by control not being performed to turn on the semiconductor switch element 31, in the case in which the battery voltage Vb increases above an acceptable voltage value, the load 50 can be turned on.

Effects of Embodiments

The control unit 20 (CPU 21) determines, in the case in which the semiconductor switch element 31 is turned on to supply power to the load 50, whether or not the power source voltage value Vb will decrease to or below an acceptable voltage value on the basis of the detected power source voltage value Vb and the load current value Ir stored in the memory 22 in advance. In the case in which the power source voltage value is determined to decrease to or below an acceptable voltage value, the semiconductor switch element 31 is not turned on. Thus, power can be supplied at or above the acceptable voltage value of the battery Ba without a power source management unit being employed. In other words, with the power supply control device 10 of the present embodiment, power can be supplied from the battery Ba to the load 50 within an acceptable range of the battery Ba using a simple configuration.

Also, the control unit 20 executes the determination processing of step S30 on the basis of the battery voltage Vb and the maximum load current value Imax. In this case, as shown by the map MP of FIG. 3, supposing that the battery voltage Vb is constant, the points P on the map are populated more in the NG region ARng at higher load current value Ir levels. Thus, determination processing can be performed in the most extreme conditions of the load current value Ir. In this way, an error caused by a decrease in the battery voltage Vb can be reliably prevented. For example, the engine shutdown of a vehicle can be reliably prevented.

Other Embodiments

The present disclosure is not limited to the embodiments described above with reference to the drawings, and, for example, the following embodiments are also included in the technical scope of the present disclosure.

The embodiment described above is an example in which the maximum value Imax of the load current value Ir is stored in the memory 22 as load current information that is used in the determination processing of step S30. However, no such limitation is intended. For example, the load current value Ir detected at present may be stored as the load current information, or a predetermined value less than the maximum value Imax may be stored as the load current information.

Figure 2:
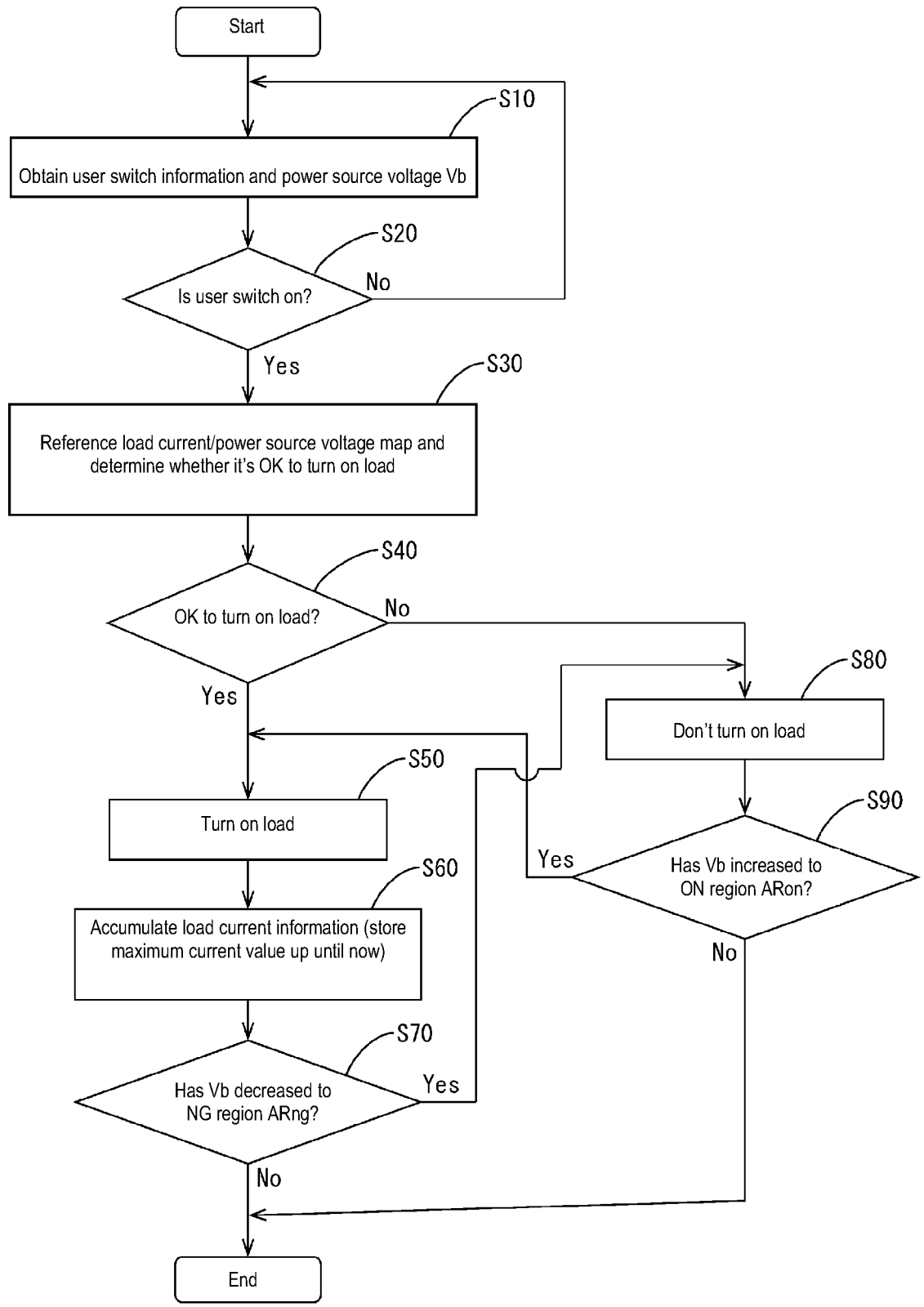
FIG. 2 is a flowchart schematically showing control of power supply to a load.

The embodiment described above is an example in which the map MP is referenced in the determination processing of step S30 shown in FIG. 2. However, no such limitation is intended. For example, determination processing may be performed simply on the basis of the power source voltage value Vb and the load current value Ir stored in the memory 22 in advance. In this case, the voltage drop amount of the power source voltage value Vb due to the load current value Ir is only required to be stored on the memory 22 or the like beforehand or via learning.

Figure 4:
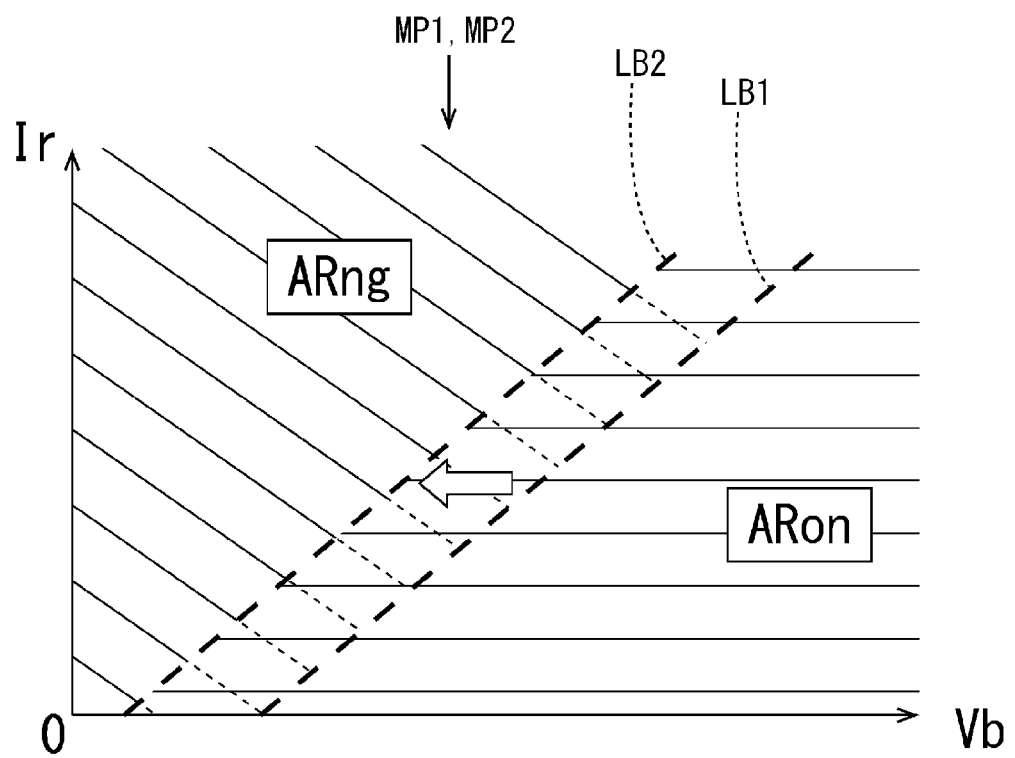
FIG. 4 is a map showing another example of the map shown in FIG. 3.

The embodiment described above is an example in which, as shown in FIG. 3, the single map MP of one type of the on region ARon and the on inhibited region ARng is stored in the memory 22 and the CPU 21 executes determination processing on the basis of the single Map MP. However, no such limitation is intended. For example, as shown in FIG. 4, a plurality (two in FIG. 4) of maps MP with different on regions ARon and on inhibited regions ARng may be stored in the memory 22, and when determination processing is executed, the one of the plurality of maps MP may be referenced in executing the determination processing. In this case, by having the plurality of maps MP corresponding to, for example, change over time of the power source Ba or the installation environment (temperature or the like), a more appropriate determination processing can be performed. In this way, the switch circuit, i.e., the power supply to the load 50, can be controlled on and off in a correct manner. Note that in FIG. 4, the two types of maps, map M1 and map M2 are shown divided with different division lines LB1, LB2.

Here, the plurality of maps MP are a plurality of maps MP corresponding to the change over time of the power source. The control unit 20 may reference one of the plurality of maps MP corresponding to the change over time of the power source when performing determination processing. In this case, by taking into consideration the change over time of the power source Ba, for example, cases in which the power source voltage Vb has decreased due to an increase in the internal resistance of the power source over time, a more appropriate determination processing can be performed (see the division lines LB1, LB2 in FIG. 4).

The embodiment described above is an example in which the control unit 20 controls the power supply to the single load 50. However, no such limitation is intended. The control unit 20 may control the power supply to a plurality of loads 50. In this case, the IPS 30 (the switch circuit 31, the current sensor 32) and the user switch SW are provided for each of the loads 50, and the switch input detection unit 12 detects the input of the switch signal Ssw from the user switch SW corresponding to each of the loads 50. Also, the memory 22 stores, as the load current value Ir, the load current value Ir corresponding to each load and the total load current value, which is the sum of the load current values of the plurality of loads. Furthermore, the control unit 20 in the determination processing determines whether or not the power source voltage value will decrease to or below an acceptable voltage value in the case in which the switch circuit 31 corresponding to the load for which an operation instruction has been received is turned on the basis of the power source voltage value Vb obtained from the voltage detection unit 11 and the load current values Ir and the total load current value stored in the memory 22 in advance.

In this way, even in the case in which the control unit 20 controls the power supply to the plurality of loads 50, power can be supplied to the plurality of loads 50 from the power source Ba within an acceptable range of the power source Ba using a simple configuration.

The invention claimed is:

1. A power supply control device for controlling power supply from a power source to a load while connected to a power supply path that supplies power from the power source to the load, the power supply control device comprising:
   a switch circuit configured to be connected to the power supply path, and to switch supply of a load current from the power source to the load on and off;
   a voltage detection unit configured to detect a power source voltage value of the power source;
   a current detection unit configured to detect the load current;
   a storage unit configured to store a load current value, which is a value of the load current;
   a switch input detection unit configured to be connected to a user switch for a user to perform an operation instruction of the load, and to detect an input of a switch signal from the user switch; and
   a control unit configured to control the switch circuit on and off, wherein
   the control unit
   executes determination processing that, when the operation instruction is received from the switch input detection unit, determines whether or not the power source voltage value will decrease to or below an acceptable voltage value if the switch circuit is turned on, on the basis of the power source voltage value obtained from the voltage detection unit and the load current value stored in the storage unit in advance, and
   executes switch control processing which allows the switch circuit to be turned on if the power source voltage value is determined to not decrease to or below the acceptable voltage value in the determination processing, and does not allow the switch circuit to be turned on if the power source voltage value is determined to decrease to or below the acceptable voltage value in the determination processing.

2. The power supply control device according to claim 1, wherein
   the control unit further executes
   voltage decrease determination processing which determines whether or not the power source voltage value has decreased to or below the acceptable voltage value after the switch circuit is turned on in the switch control processing.

3. The power supply control device according to claim 2, wherein
   the storage unit stores a maximum load current value, which is one of a plurality of the detected load current values; and
   the control unit executes the determination processing on the basis of the power source voltage value and the maximum load current value that is stored in the storage unit.

4. The power supply control device according to claim 2, wherein
   the storage unit stores a map indicating a relationship between a power source voltage and the load current, the map including an on region where the switch circuit is allowed to be turned on and an on inhibited region where the switch circuit is not allowed to be turned on, and
   the control unit references the map in performing the determination processing.

5. The power supply control device according to claim 2, wherein
   the load is constituted by a plurality of loads,
   the switch circuit is provided for each one of the plurality of loads,
   the switch input detection unit detects an input of a switch signal from a user switch corresponding to each one of the plurality of loads,
   the storage unit stores, as the load current value, a load current value corresponding to each one of the plurality of loads and a total load current value, which is a sum of the load current values of the plurality of loads,
   the control unit, in determination processing, determines whether or not the power source voltage value will decrease to or below an acceptable voltage value if a switch circuit corresponding to a load for which an operation instruction has been performed is turned on, on the basis of the power source voltage value obtained from the voltage detection unit and each load current value and the total load current value stored in the storage unit in advance.

6. The power supply control device according to claim 1, wherein
   the control unit further executes
   voltage increase determination processing which determines whether or not the power source voltage value has increased above the acceptable voltage value after the switch circuit is not allowed to be turned on in the switch control processing.

7. The power supply control device according to claim 6, wherein
   the storage unit stores a maximum load current value, which is one of a plurality of the detected load current values; and
   the control unit executes the determination processing on the basis of the power source voltage value and the maximum load current value that is stored in the storage unit.

8. The power supply control device according to claim 6, wherein
   the storage unit stores a map indicating a relationship between a power source voltage and the load current, the map including an on region where the switch circuit is allowed to be turned on and an on inhibited region where the switch circuit is not allowed to be turned on, and
   the control unit references the map in performing the determination processing.

9. The power supply control device according to claim 6, wherein
   the load is constituted by a plurality of loads,
   the switch circuit is provided for each one of the plurality of loads,
   the switch input detection unit detects an input of a switch signal from a user switch corresponding to each one of the plurality of loads,
   the storage unit stores, as the load current value, a load current value corresponding to each one of the plurality of loads and a total load current value, which is a sum of the load current values of the plurality of loads, the control unit, in determination processing, determines whether or not the power source voltage value will decrease to or below an acceptable voltage value if a switch circuit corresponding to a load for which an operation instruction has been performed is turned on, on the basis of the power source voltage value obtained from the voltage detection unit and each load current value and the total load current value stored in the storage unit in advance.

10. The power supply control device according to claim 1, wherein
the storage unit stores a maximum load current value, which is one of a plurality of the detected load current values; and
the control unit executes the determination processing on the basis of the power source voltage value and the maximum load current value that is stored in the storage unit.

11. The power supply control device according to claim 10, wherein
the storage unit stores a map indicating a relationship between a power source voltage and the load current, the map including an on region where the switch circuit is allowed to be turned on and an on inhibited region where the switch circuit is not allowed to be turned on, and
the control unit references the map in performing the determination processing.

12. The power supply control device according to claim 10, wherein
the load is constituted by a plurality of loads,
the switch circuit is provided for each one of the plurality of loads,
the switch input detection unit detects an input of a switch signal from a user switch corresponding to each one of the plurality of loads,
the storage unit stores, as the load current value, a load current value corresponding to each one of the plurality of loads and a total load current value, which is a sum of the load current values of the plurality of loads,
the control unit, in determination processing, determines whether or not the power source voltage value will decrease to or below an acceptable voltage value if a switch circuit corresponding to a load for which an operation instruction has been performed is turned on, on the basis of the power source voltage value obtained from the voltage detection unit and each load current value and the total load current value stored in the storage unit in advance.

13. The power supply control device according to claim 1, wherein
the storage unit stores a map indicating a relationship between a power source voltage and the load current, the map including an on region where the switch circuit is allowed to be turned on and an on inhibited region where the switch circuit is not allowed to be turned on, and
the control unit references the map in performing the determination processing.

14. The power supply control device according to claim 13, wherein
the storage unit stores a plurality of maps in which the on region and the on inhibited region are different, and
the control unit references one of the plurality of maps in performing the determination processing.

15. The power supply control device according to claim 14, wherein
the plurality of maps are maps corresponding to change over time of the power source, and
the control unit references a map of the plurality of maps corresponding to change over time of the power source in performing the determination processing.

16. The power supply control device according to claim 7, wherein
the load is constituted by a plurality of loads,
the switch circuit is provided for each one of the plurality of loads,
the switch input detection unit detects an input of a switch signal from a user switch corresponding to each one of the plurality of loads,
the storage unit stores, as the load current value, a load current value corresponding to each one of the plurality of loads and a total load current value, which is a sum of the load current values of the plurality of loads,
the control unit, in determination processing, determines whether or not the power source voltage value will decrease to or below an acceptable voltage value if a switch circuit corresponding to a load for which an operation instruction has been performed is turned on, on the basis of the power source voltage value obtained from the voltage detection unit and each load current value and the total load current value stored in the storage unit in advance.

17. The power supply control device according to claim 14, wherein
the load is constituted by a plurality of loads,
the switch circuit is provided for each one of the plurality of loads,
the switch input detection unit detects an input of a switch signal from a user switch corresponding to each one of the plurality of loads,
the storage unit stores, as the load current value, a load current value corresponding to each one of the plurality of loads and a total load current value, which is a sum of the load current values of the plurality of loads,
the control unit, in determination processing, determines whether or not the power source voltage value will decrease to or below an acceptable voltage value if a switch circuit corresponding to a load for which an operation instruction has been performed is turned on, on the basis of the power source voltage value obtained from the voltage detection unit and each load current value and the total load current value stored in the storage unit in advance.

18. The power supply control device according to claim 13, wherein
the load is constituted by a plurality of loads,
the switch circuit is provided for each one of the plurality of loads,
the switch input detection unit detects an input of a switch signal from a user switch corresponding to each one of the plurality of loads,
the storage unit stores, as the load current value, a load current value corresponding to each one of the plurality of loads and a total load current value, which is a sum of the load current values of the plurality of loads,
the control unit, in determination processing, determines whether or not the power source voltage value will decrease to or below an acceptable voltage value if a switch circuit corresponding to a load for which an operation instruction has been performed is turned on, on the basis of the power source voltage value obtained from the voltage detection unit and each load current value and the total load current value stored in the storage unit in advance.

19. The power supply control device according to claim 1, wherein the load is constituted by a plurality of loads, the switch circuit is provided for each one of the plurality of loads, the switch input detection unit detects an input of a switch signal from a user switch corresponding to each one of the plurality of loads, the storage unit stores, as the load current value, a load current value corresponding to each one of the plurality of loads and a total load current value, which is a sum of the load current values of the plurality of loads, the control unit, in determination processing, determines whether or not the power source voltage value will decrease to or below an acceptable voltage value if a switch circuit corresponding to a load for which an operation instruction has been performed is turned on, on the basis of the power source voltage value obtained from the voltage detection unit and each load current value and the total load current value stored in the storage unit in advance.

\* \* \* \* \*